March 9, 1954   J. A. SENN   2,671,838
CONDITION RESPONSIVE DEVICE
Filed June 13, 1951   3 Sheets-Sheet 1

INVENTOR.
JURG A. SENN
BY
Tate & Weikart
ATTORNEYS

March 9, 1954     J. A. SENN     2,671,838
CONDITION RESPONSIVE DEVICE
Filed June 13, 1951     3 Sheets-Sheet 2
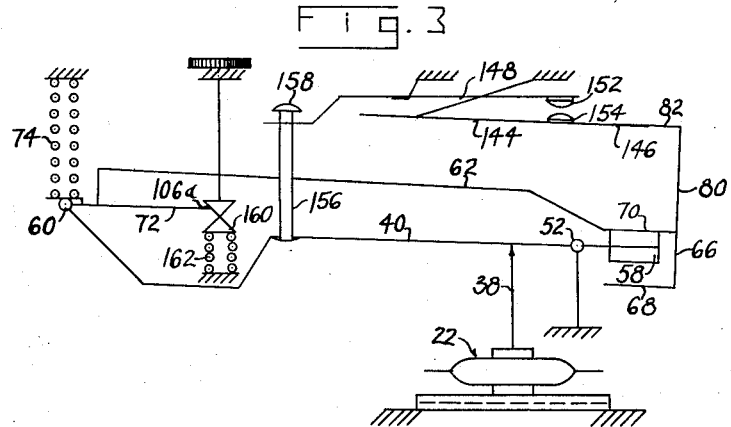
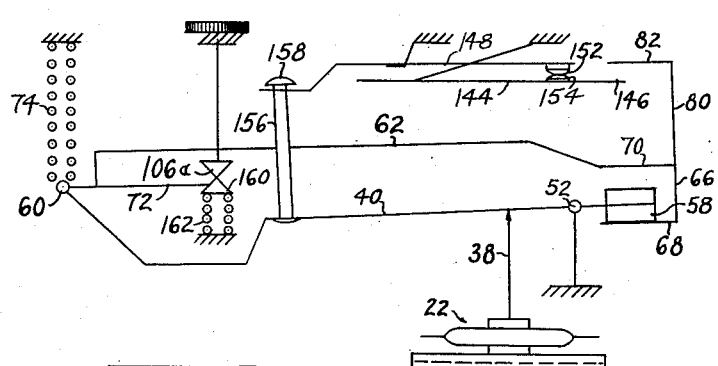
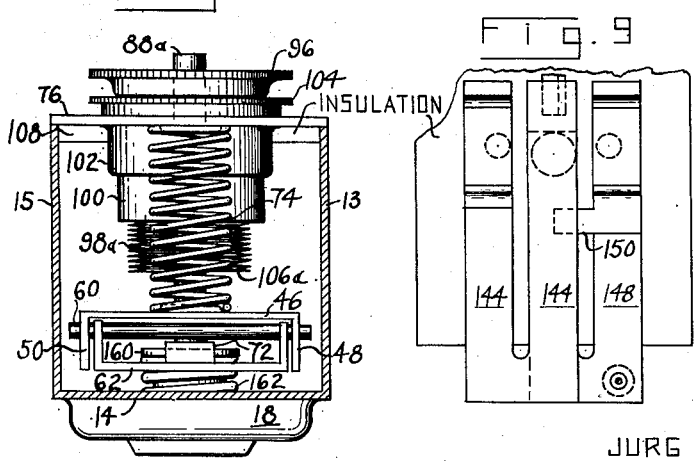
INVENTOR.
JURG A. SENN
BY
Tate & Weikart
ATTORNEYS March 9, 1954 J. A. SENN 2,671,838
CONDITION RESPONSIVE DEVICE
Filed June 13, 1951 3 Sheets-Sheet 3

*INVENTOR.*
JURG A. SENN
BY
Tate & Weikart
ATTORNEYS

Patented Mar. 9, 1954

2,671,838

UNITED STATES PATENT OFFICE 2,671,838

CONDITION RESPONSIVE DEVICE

Jurg A. Senn, Milwaukee, Wis., assignor to Perfex Corporation, Milwaukee, Wis., a corporation of Wisconsin Application June 13, 1951, Serial No. 231,312

10 Claims. (Cl. 200—140)

This invention relates to a condition responsive device and more particularly to that type of condition responsive device wherein a switch mechanism is utilized to control apparatus in response to variations in value of a condition, such as temperature or pressure.

An object of this invention is to provide a condition responsive device capable of operating as a fan control and, with modifications, as a limit control for a heating system, with a maximum number of inter-changeable parts in the two forms to facilitate manufacture and repair.

Another object of the invention is to provide a limit control utilizing unique "fail safe" features to furnish complete shut-down of the heating system in the event of failure of the condition responsive element.

Another object of the invention is to provide means in the form of pointers and scales to permit resetting of the device for different temperature operations and for indicating the temperature setting thereof as desired.

A still further object of the invention is to provide a novel arrangement of levers and abutments to effect the required switching action under all conditions of operation including failure or rupture of the condition responsive element.

These and further objects will become apparent as this description proceeds and will be particularly pointed out in the appended claims.

Reference is now to be had to the accompanying drawings in which:

Figure 3 is a schematic view of the limit switch portion shown in the "hot trip" position;

Figure 4 is a schematic view of the limit switch portion shown in the "cold trip" position;

Figure 5 is a schematic view of the limit switch portion shown in the "fail safe" position;

Figure 6 is a schematic view of a modified form of the limit switch shown in the "fail safe" position;

Figure 7 is a left side view, partially in section, of the limit switch of Figure 2;

Figure 8 is a right side view, partially in section, of the limit switch of Figure 2; and Figure 9 is a plan view taken along the lines IX—IX of Figure 2.

Figure 1:
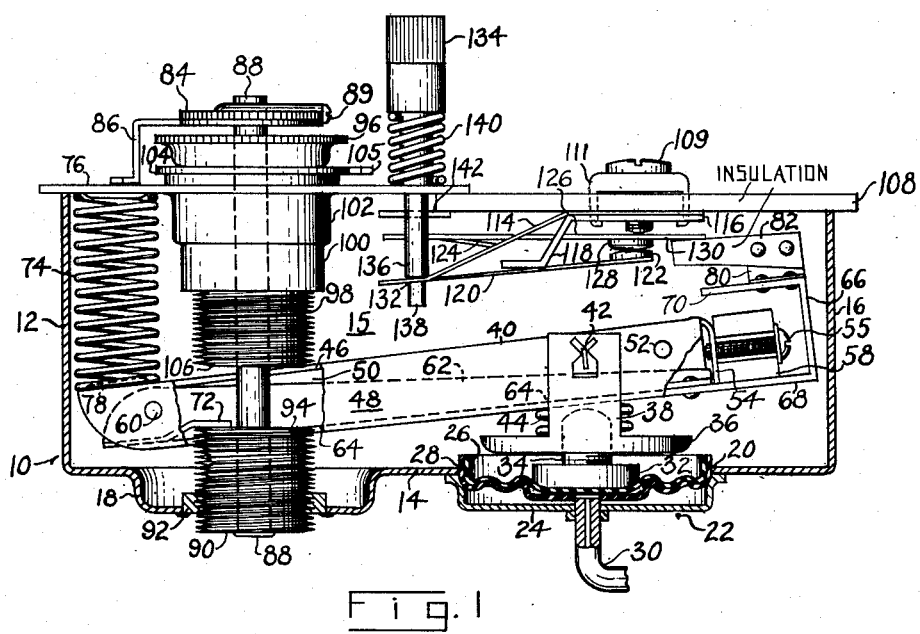
Figure 1 is a front view, partially in section, of the fan switch portion of the device.
Figure 2:
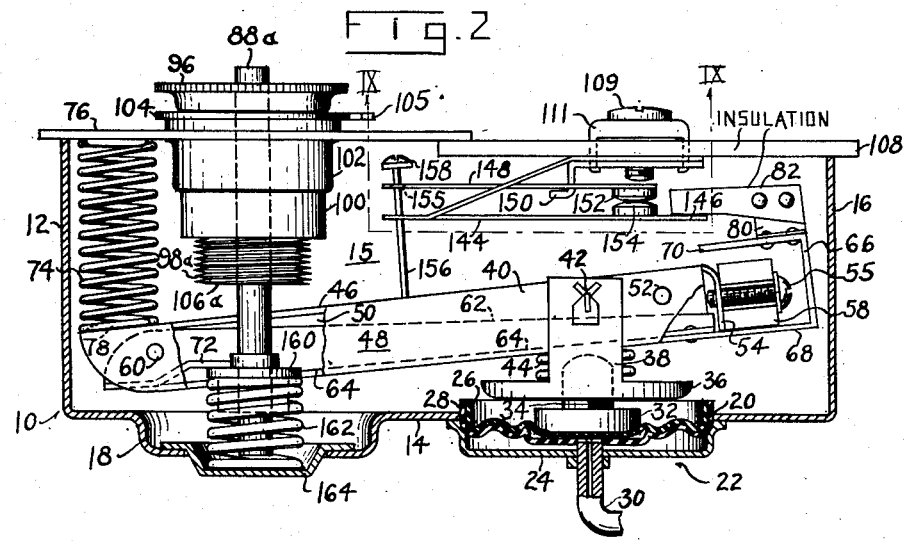
Figure 2 is a front view, partially in section, of the limit switch portion of the device.

Referring now to Figures 1 and 2, in which is shown a metal casing 10 consisting of end plate 12, front plate 13 (removed in Figs. 1 and 2 but shown in Figs. 7 and 8), base plate 14, rear plate 15, and end plate 16. The base plate 14 has a protruding boss 18 and an aperture 20. The aperture 20 enables a condition responsive element 22, fastened to the base 14, to perform a function within the casing 10 in response to an external condition. The condition responsive element 22 may be any type of element that responds to temperature or pressure to perform linear motion, but the preferred type is the one shown. The type of condition responsive element shown consists of a receptacle 24 secured to the base 14 by means of welding or screws, a pair of nested diaphragms 26 and 28, and a hollow tube 30 communicating with the area between the diaphragms 26 and 28. The tube 30 extends to a bulb (not shown) placed in proximity to a condition to be controlled in such a manner that the bulb and tube are effected by changes in the condition, such as temperature changes in the bonnet of a hot air furnace. The bulb is usually filled with a thermally-expansible fluid which expands on temperature increases and contracts on temperature decreases. This fluid filled system is designated as the condition responsive element 22. The upper diaphragm 26, which is one of the two movable portions of the condition responsive element 22, has resting thereon a head portion 32 of a threaded bolt 34. The bolt 34 is screw threaded within a gimbal base 36. The gimbal base 36 has two gimbal ears 38 and 39, fulcrumly attached to a channeled lever 40 (hereinafter called the main lever) by means of a struck-out portion 42 and 43 (Figure 8) of lever 40. A spring 44 is interposed between the gimbal base 36 and the base 46 of the main lever 40 to perform a dual function, as follows; the spring 44 acts as a resilient retainer for the gimbal base 36 and the main lever 40 to allow a relative pivotal movement between them under linear movement of the gimbal base 36, and the spring 44 also acts as a strain relief spring under certain conditions when the main lever 40 is pivoted to its uppermost position and continued travel of the movable diaphragm 26 neccessitates continued travel of the gimbal base 36. This latter function helps to prevent rupture of the condition responsive element under excessively high temperature conditions of operation.

The main lever 40 has side channels 48 and 50 bent at right angles to the base 46. A pin 52 is pivotally mounted on the casing and extends through apertures in the side channels 48 and 50. This pivot pin 52 is the primary pivot of the device and the only fixed pivot extending through the cover plates 13 and 15 of the casing 10 (Figure 8). A bent over end piece 54, an extension of base 46 of main lever 40, is threadably apertured to receive two retaining screws 55 and 56 (Figure 8), which hold a permanent magnet 58 against the end piece 54.

At the left end of main lever 40, a pivot pin 60 pivotally connects the main lever 40 with a second channel shaped lever 62 (hereinafter called the trip lever), which lies within the sides 48 and 50 of main lever 40. The trip lever 62 has an apertured base 64 through which extends the spring 44 and other parts to be later described. At the right end of trip lever 62 (Figs. 1 and 2), the base 64 has riveted thereto a U-shaped bracket 66 which acts as a dual armature for magnet 58. The lower armature leg 68 of bracket 66, as shown, is in magnetic attraction with the magnet 58. The upper armature leg 70, as shown, is spaced away from the magnet 58.

At the left end of trip lever 62 (Figs. 1 and 2), the base 64 has riveted thereto an abutment finger 72 which co-acts with abutments to pivot the trip lever 62 about the pivot pin 60, in a manner to be further described. A compression type spring 74 is interposed between the cover 76 and a boss 78 on main lever 40 to bias the lever assembly (40—60—62) in a downward direction. The spring 74 acts in opposition to the expansible force of condition responsive element 22 as directed against the lever assembly.

The upper armature leg 70 of bracket 66 has riveted thereto a bracket 80 which supports an insulation trip bar 82. The bar 82, integral in movement with trip lever 62, engages a control instrumentality, herein shown as a switch mechanism.

The parts heretofore described are the parts common to both the fan control of Figure 1 and the limit control of Figures 2, 7, and 8, with a few minor exceptions.

Referring specifically to Figure 1, the fan control will now be described. In the operation and control of a hot air heating system, for example, the intermittent operation of a fan or blower to disseminate heated air within a room or other enclosure is a desirable function. The usual method is to provide thermostatic operation of the fan upon the attainment of a set temperature of say 120° F. with continued fan operation until the bonnet temperature drops to say 100° F., whereupon fan operation ceases. In the present invention provision is made for the on-operation of the fan at any preferred setting and also for shut-off of the fan at a preferred lower setting.

In Figure 1 the higher setting (120° F.) for on-operation of the fan is obtained by manual rotation of a serrated disc 84 having a pointer 86, designating the degrees of temperature on a scale (not shown). The scale may be graduated in degrees from 75° F. to 155° F., impressed on the face of the cover member 76. The disc 84 is rigidly secured to a shaft 88 by means of a set screw 89 threaded in the disc 84. The shaft 88 is secured at its other end to a threaded plug 90. The plug 90 is received in a threaded collar 92 secured to the protruding boss 18 by brazing, soldering, or other suitable means. Thus, rotative movement of the disc 84 results in rotation and consequentially vertical movement of the plug 90 within the collar 92. The upper surface of plug 90 defines an abutment 94 which co-acts with the finger 72 of trip lever 62 upon movement of the lever assembly (40—60—62) in a downward direction. Different manual settings of the disc 84 vary the height of the abutment 94 to vary the distance through which the finger 72 must move for engagement with abutment 94.

A serrated, disc-shaped knob 96, concentric with disc 84 and shaft 88, is provided for adjustment of the lower temperature or the off-position of the fan. The knob 96 is integral with a threaded plug 98 adjustable within a threaded collar 100. The collar 100 has affixed thereto a flanged boss 102 formed in the cover member 76. A serrated disc 104 having a pointer 105 is fastened by screws or other suitable means to the knob 96. The pointer 105 utilizes the same scale as the pointer 86, in the same manner as the hands of a clock. Manual adjustment of the knob 96 varies the height of an abutment 106 on the plug 98. The abutment 106 co-acts with finger 72 of trip lever 62 in the upward direction of travel of the lever assembly (40—60—62).

An insulation cover member 108 supports the switch contact structure to be subsequently described. Terminal screws 109 and 110 furnish a means for external connection to the fan and electric power supply (not shown). U-shaped clamps 111 and 112 provide securing means for the screws 109 and 110 and the switch contact structure on the opposite side of the switch supporting member 108. The strip 114 extends in a generally U-shape, to a switch arm 120. The switch arm 120 supports a contact 122. The arm 120 is spaced from the switch supporting member 108 by the branch 118 of a rigid strip 116. A U-shaped strip 124 of spring-like conductive material is secured by the inturned ends of clamp 112 against the switch supporting member 108. A switch arm 126 of strip 124 overlies the arm 120 (Figure 1) and supports a contact 128. An extension 130 of arm 126 is spring biased downwardly against the insulation trip bar 82. A hole 132 in strip 114 provides a means for resetting the switch contacts to closed position. A reset button 134, loosely journaled in the cover 76, has a rod portion 136, larger in diameter than the hole 132 and a smaller extension 138 protruding through the hole 132. A spring 140 interposed between the button 134 and the cover 76 biases the reset to its uppermost position. A latch pin 142 perpendicularly secured to the rod 136 enables an operator to depress the button 134, turn the button 134 a half-turn and latch the pin 142 beneath the switch supporting member 108. This pivots the arm 120 of strip 114 counter-clockwise about the branch 118, moving contact 122 into engagement with contact 128. With the parts in the position shown in Figure 1 the contacts (122—128) would normally be open because the trip bar 82 is in its uppermost position, but as shown the reset button has pivoted the arm 120 and contact 122 upwardly into engagement with contact 128.

*Fan control—operation*

With the device in the position shown in Figure 1 and the reset button 134 turned to the unlatched position instead of the latched position as shown, the contacts (122—128) are in the open position. The circuit to the fan motor and electric power supply will then be open.

Assuming an on-fan setting of 120° F. has been made with disc 104 and an off-fan setting of 100° F. has been made with disc 84, the starting of a heating cycle will initiate operation of the device. The remote bulb (not shown) is usually placed in the bonnet of the furnace where it will respond to the temperature of the heated air. After a period of heating, sufficient to raise the temperature of the bonnet air to 120° F. the fluid in the thermo-responsive bulb will have expanded proportionally. This expansion will be reflected through the tube 30 into the area between diaphragms 26 and 28, forcing the upper diaphragm 26 to flex upwardly. The expansion of the diaphragm 26 carries the head portion 32, the gimbal base 36 and gimbal ears 38, 39 upwardly, causing the lever assembly (40—60—62) to pivot clockwise about the pivot pin 52. This pivotal movement raises the opposite end of the lever (40—60—62) upwardly against the bias of spring 74 until the abutment finger 72 engages the abutment 106 at which point the trip lever 62 breaks away from main lever 40 to pivot clockwise about the pivot pin 60. The right end of trip lever 62, carrying the armature bracket 66, pulls away from the main lever 40, pin 52 and magnet 58. A snap action results which pulls armature leg 70 into engagement with the magnet 58. This causes the insulation trip bar 82 to release the spring-biased extension 130 of arm 126 to close the contacts (122—128). Closure of contacts (122—128) completes the fan circuit to start the fan operation, circulating heated air through the duct system. The fan will operate continuously until the bonnet temperature drops to 100° F.

With a decrease in bonnet temperature, the diaphragm 26 will collapse proportionally, carrying the gimbal assembly (36, 38 and 39), and lever assembly (40—60—62) downwardly under the bias of spring 74. This movement will pivot the lever assembly (40—60—62) counter-clockwise about the pivot pin 52 until the abutment finger 72 engages the abutment 94, at which point the trip lever 62 will again break away from main lever 40 to pivot counter-clockwise about the pivot pin 60. The armature leg 70 will pull away from the magnet 58 and the armature leg 68 will be attracted to the magnet 58 resulting in an upward snap action of the bracket 66. This will cause the trip bar 82 to engage the extension 130; carrying the contact 128 upwardly, out of engagement with the contact 122. This opens the fan circuit until the bonnet temperature again rises to 120° F., at which setting, the on-operation is repeated.

The re-set button 134 may be manually operated at any time to either close the fan circuit, if open, or maintain the fan circuit in closed position, if closed. This function is desirable under many instances, for example during warm weather, when the heating system is inoperative, to circulate air to provide a cooling function. The re-set operation may also be required in the event of failure of the condition responsive device to close the contacts and excessive heating of the furnace would result in objectionable hazards. Manual operation of the fan switch enables the excess heat to be dissipated more rapidly to prevent over-heating of the furnace.

The operation of the reset feature is as follows: With the contacts (122—128) in the open position, the switch arm 120 lies parallel with the switch supporting cover 108. On manual depression of the re-set button 134 against the bias of spring 140, the rod portion 136 engages the switch arm 120 at the hole 132. The smaller diameter extension 138 of rod 136 extends through the hole 132. The downward movement of rod 136 pivots the switch arm 120 counter-clockwise about the branch 118 to bring contact 122 into engagement with contact 128. The reset button 134 is latched in this new position by rotating the re-set button 134 which turns the rod 136 and latch pin 142 until the pin 142 is in the position shown at which point the re-set button 134 is released. The switch supporting member 108 holds the pin 142 and the re-set button in the position shown. Rotation of the re-set button 134 will cause the pin 142 to slip off the switch supporting member 108 and the spring 140 will return the switch to open position.

*Limit control—description*

Referring to Figures 2, 7, 8, and 9, the limit control portion of the invention will now be described. Note, that the switch elements of Figure 1 are in a reversed position. The lower contact arm 144 carries the extension 146 which corresponds to the extension 130 of Figure 1. The upper contact arm 148 overlies a depending branch 150 which corresponds to the branch 118 of Figure 1. The upper contact arm 148 supports a contact 152 in proximity to a contact 154 on arm 144. A hole 155 in the arm 148 permits a rod 156 to move freely therein. The head 158 of rod 156 is larger in diameter than the hole 155 to engage the arm 148 after a predetermined distance in a downward direction has been reached. The rod 156 is secured at its other end to the channel base 46 of channel main lever 40. It may be either welded or adjustably retained at the channel base 46.

The threaded plug 98a with its abutment 106a has been raised by turning the disc 104 and pointer 105 counter-clockwise to a setting of 200° F., for example (a higher scale graduated from 165° F. to 250° F. is used for the limit control). The limit control has the function of opening the entire heating control circuit upon the attainment of a high temperature to prevent overheating of the furnace beyond a safe maximum temperature. For purposes of explanation a temperature setting of 200° F. has been made but obviously any preferred setting may be used, depending upon the particular heating requirements, condition of furnace, etc. This temperature (200° F.) represents the temperature threshold above which the heating system is unsafe. Shutdown may be maintained until the temperature drops to 180° F., for example, before the device again energizes the heating system. This difference (180° F.-200° F.) is dependent upon the operating differential as determined by the adjustable abutment 106a in relation to an abutment collar 160 and a spring 162. The abutment collar 160 is loosely contained concentric with the shaft 88a, for longitudinal movement therewith under the bias of spring 162. Note, that the shaft 88a, though comparable with shaft 88 is not secured to the lower abutment as in Figure 1. It acts merely as a guide for the abutment assembly. Thus there is an adjustable fixed abutment 106a for upward travel of lever assembly (40—60—62) and a non-adjustable resilient abutment 160 for downward travel of lever assembly (40—60—62). Note, that the increased distance for upward travel of lever assembly (40—60—62) in Figure 2 is commensurate with the increased temperature setting in Figure 2 (200° F.).

For assembly purposes a latch-type retainer 164 serves to hold the spring 162 and abutment collar 160 in place against the boss 18.

*Limit control—operation*

Referring now to Figures 3, 4, and 5, in which three positions of the limit switch are shown schematically. Figure 3 illustrates the limit switch in the contact-open position, herein called the "hot trip" position occasioned by the condition responsive element 22 responding to a temperature in excess of 200° F., the set limit temperature; Figure 4 illustrates the limit switch in the contact-closed position, herein called the "cold trip" position occasioned by the condition responsive element 22 responding to a temperature below 180° F., the differentially determined temperature; and Figure 5 illustrates the limit switch in the contact-open position, herein called the "fail safe" position occasioned by failure of the condition responsive element 22 or its cooperative parts.

Operation of the limit switch from the "cold trip" position of Figure 4 to the "hot trip" position of Figure 3 will now be described. As a rule the temperature responsive bulb (not shown) is placed in the furnace bonnet to respond to bonnet temperature. The bulb communicates temperatures changes in the bonnet to the expansible bellows through a connecting tube (not shown). When a fluid filled system is used, temperature increases cause expansion of the fluid which can be expressed in movement of the diaphragm 26 upwardly. Assuming that the heating system is calling for heat (in response to room thermostat demand), the continued rise in temperature in the furnace bonnet is reflected in an upward movement of diaphragm 26 of condition responsive element 22. With a temperature increase to 200° F. the following action occurs: gimbal ears 38 and 39 move upwardly pivoting the entire leverage system (main lever 40, pivot pin 60, and trip lever 62) clockwise about the pivot pin 52 against the bias of spring 74. This unitary movement continues until the abutment finger 72 engages the abutment 106a at which point main lever 40 continues its upward trend but trip lever 62 pivots clockwise about the pivot pin 60. The trip lever 62 is now carrying the right end 70 downwardly into proximity with the magnet 58. The resulting snap action carries the bracket 80 and trip bar 82 downwardly against the extension 146 with a quick opening of contacts (152—154). Opening of contacts 152—154 disrupts the control circuit for the heating system, causing shutdown, etc. This action is similar to the on-fan operation of Figure 1.

Operation from the "hot trip" position to the "cold trip" position will now be described. If the temperature of the bonnet air decreases below 200° F. and continues to fall to a point below 180° F., the following action will occur. The contraction of the fluid in the bellows causes the diaphragm 26 to descend. The spring 74, though a weaker spring than spring 162, has a greater mechanical advantage (due to its location at a longer distance from pivot pin 52) and thereby exerts a force downwardly on the lever assembly (40—60—62) in excess of the combined upward force of the spring 162 and the condition responsive element 22 in its present condition. As the pivot pin 60 and lever assembly (40—60—62) descend, counter-clockwise about the pivot pin 52, the system approaches the "cold trip" position with a change in the effective forces acting on the lever assembly. The abutment finger 72 engages the abutment 160 which exerts a force upwardly on trip lever 62, counter-clockwise about pivot pin 60. The upward force of the condition responsive element 22 is steadily decreasing. The upward force of the spring 162 is increasing due to its greater compression. The downward force of spring 74 is decreasing due to its greater expansion. Thus, the increased upward force of spring 162 aids the trip lever 62 to change its position from the "hot trip" position of Figure 3 to the "cold trip" position of Figure 4. With the resulting snap action of armature leg 68 into magnetic attraction with magnet 58 and the release of extension 146 by trip bar 82, the limit switch contacts (152—154) are closed. At this point the lever assembly (40—60—62) reaches a quiescent position wherein the downward force of a spring 74 equals the residual upward force of condition responsive element 22 plus the somewhat negligible upward force of spring 162 which has been released by the snap action from compression. The condition responsive element 22 has a residual force upwardly in the "cold trip" position, because at the time of filling the fluid fill system an initial deflection was provided for by forcing the fluid into the system and under ordinary room temperatures a slight expansion or deflection is evident.

The "fail safe" operation will now be described (Figure 5). With the system as shown in Figure 4 the forces above mentioned are equal. The "fail safe" feature of this invention provides for shut down of the heating system upon failure of the condition responsive element 22. As heretofore mentioned, the lever assembly (40—60—62) maintains a position of equilibrium in Figure 4 because of the equalization of forces, one of which is the residual upward force of the condition responsive element 22. It is to be noted that at the "cold trip" position of Figure 4, the spring 162 has expanded to its normal position because of the snap action which "spread" the levers 40 and 62 apart. In case the condition responsive element 22 has failed for any reason, the removal of the residual upward force at 38 causes the spring 74 to continue the downward motion of pivot pin 60 and levers 62 and 40. The additional downward or counter-clockwise movement of main lever 40 about pivot pin 52 brings the head 158 into engagement with the leg 148. This pivots the leg 14 counter-clockwise about the branch 150 to carry contact 152 out of engagement with contact 154. This opens the heating control circuit to prevent operation during the period of failure of the condition responsive element 22. During the "fail safe" movement of pivot pin 60 downwardly, it is apparent that the finger 72 again forces the abutment 160 and spring 162 downwardly. This compression of spring 162 creates a force acting upwardly in opposition to spring 74, but this force remains less than the force of spring 72 up to the time of "fail safe" operation of the contacts (152—154). Obviously after that period a point will be reached when the upward force of spring 162 equals the downward force of spring 74, at which point the lever assembly comes to rest. Therefore, it is important to adjust the head 158 so that it actuates the contact leg 148 prior to that point of quiescence; otherwise the "fail safe" arrangement will not function to shut down the heating control system.

Referring now to Figure 6 in which a modified "fail safe" arrangement is shown, the corresponding parts are indicated by identical numbers and similar parts are indicated by identical numbers with the suffix "a" added.

In this modification the trip lever 62a is provided with an extension 170 which is apertured at its end to receive a headed bolt 172. The bolt 172 is adjustably threaded in the base of the casing 10 and is provided with a head portion 174 and the threaded abutment portion 176.

The magnet 58a is secured to the base of the casing 10 instead of to the main lever 40 as in the embodiment of Figure 5.

The operation of this modification from the "cold trip" position to the "fail safe" position will now be described. Assuming that a failure of the condition responsive element 22 has resulted, the spring 74 moves the main lever 40a and pin 60 downwardly or counter-clockwise about the pivot 52.

The finger 72a (in the "cold trip" position) is already abutting the abutment 160. The further downward movement of pin 60 and finger 72a causes trip lever 62a and its component finger 72a to pivot counter-clockwise about the abutment 160. This movement continues until the extension 170 engages the abutment portion 176 of bolt 172, at which time the trip lever 62a reverses its direction and moves clockwise about the abutment 176. The pivot pin 60 in both instances operates as a hinge instead of a pivot point. This movement results in a snap action of armature leg 70 into engagement with magnet 58a and the opening of contacts (152—154) by trip bar 82.

It is apparent that this modification utilizes the same trip bar 82 to open the switch as in the "hot trip" function. Obviously, the device could be utilized to control a valve or other control function and the utilization of a switch was merely for purposes of illustration.

Many modifications and substitutions are possible in this invention and it is intended to be limited only by the scope of the appended claims.

What is claimed is:

1. An actuating mechanism for operating a control instrumentality comprising, a condition responsive element, a main lever pivotally mounted intermediate its ends and movable by said condition responsive element, a trip lever pivotally connected at one of its ends to said main lever, a spring acting in opposition to movement of said condition responsive element in one direction, a pair of abutments for engagement with said trip lever, and a control instrumentality operated by said trip lever after a pre-determined distance of travel of said trip lever results in engagement of said trip lever with one of said pair of abutments to effect such operation.

2. A mechanism for actuating a control instrumentality comprising, a condition responsive element, a first lever movable by said condition responsive element about a fixed pivot, a spring opposing movement of said first lever in one direction of travel and aiding movement of said first lever in another direction of travel, a second lever pivotally mounted at one of its ends on said first lever and movable by said first lever, a first abutment for engagement with said second lever in one direction of travel of said second lever, a second abutment for engagement with said second lever in another direction of travel of said second lever, said abutments engaging said second lever at a point intermediate its free end and its pivotally mounted end, a switch mechanism operable to a first position by said second lever after engagement of said second lever with said first abutment and operable to a second position by said second lever after engagement of said second lever with said second abutment, and a member connecting said first lever and said switch mechanism whereby continued movement of said first lever in said one direction moves said member to operate said switch mechanism to said second position.

3. A mechanism for actuating a control instrumentality comprising, a casing, a condition responsive element fastened to said casing, a main lever movable by said condition responsive element about a fixed pivot, a spring opposing movement of said main lever in one direction of travel and aiding movement of said main lever in another direction of travel, a movable pivot carried by the free end of said main lever, a trip lever secured to said movable pivot and movable by said main lever, an abutment finger on said trip lever, a first adjustable abutment for engagement with said abutment finger in one direction of travel of said trip lever, a second adjustable abutment for engagement with said abutment finger in another direction of travel of said trip lever, a first indicating means for said first abutment, a second indicating means for said second abutment, a scale for said first and second indicating means, a trip bar connected to the free end of said trip lever, a switch mechanism operated to a first position by said trip bar after engagement of said abutment finger with said first abutment and operated to a second position by said trip bar after engagement of said abutment finger with said second abutment, and manual reset means connected to said switch mechanism to operate said switch mechanism to said first position.

4. In a fan control mechanism the combination of, a casing, a condition responsive element fastened to said casing and providing linear motion, a fixed pivot, a first lever operated by said condition responsive element to move about said pivot, a movable pivot carried by said first lever, a spring biasing said movable pivot and said first lever in one direction of travel, a second lever connected to said movable pivot, an abutment finger on said second lever, a first abutment for engagement with said abutment finger in one direction of travel of said second lever, a second abutment for engagement with said abutment finger in another direction of travel of said second lever, said abutments engaging said abutment finger at a point intermediate the free end and the pivotally mounted end of said second lever, a trip bar connected to the free end of said second lever, a switch arm engaged by said trip bar in one direction of travel of said second lever to actuate a switch, and manual reset means operated independently of said lever means to actuate said switch.

5. In a switch actuating mechanism the combination of, a condition responsive element, a main lever operable by said condition responsive element about a fixed pivot, a movable pivot mounted on the free end of said main lever, a spring opposing movement of said movable pivot and said main lever, a trip lever connected at one of its ends to said movable pivot, an abutment finger on said trip lever, a first abutment for engagement with said abutment finger in one direction of travel of said trip lever, a second abutment for engagement with said abutment finger in another direction of travel of said trip lever, said first and second abutments engaging said abutment finger at a point intermediate the free end and the pivotally connected end of said trip lever, an extension on said trip lever extending in a parallel but opposite relation to said abutment finger, a third abutment for engagement with said extension a predetermined distance of travel of said trip lever after engagement of said abutment finger with said second abutment, and a switch mechanism operated to a first position by movement of said trip lever in one direction and operated to a second position by movement of said trip lever in another direction and operated to said first position upon continued movement of said trip lever in said another direction beyond a predetermined limit.

6. A mechanism for actuating a contral instrumentality comprising, a condition responsive element providing linear movement, a main lever movable by said condition responsive element about a fixed pivot, a spring opposing movement of said main lever in one direction of travel and aiding movement of said main lever in another direction of travel, a movable pivot carried by the free end of said main lever and movable therewith, a trip lever connected at one of its ends to said movable pivot, an abutment finger on said trip lever, a first abutment for engagement with said abutment finger in one direction of travel of said trip lever, a second abutment for engagement with said abutment finger in another direction of travel of said trip lever, said abutments engaging said abutment finger at a point intermediate the free end and the pivotally connected end of said trip lever, a trip bar connected to the free end of said trip lever, and a control instrumentality operated to a first position by said trip bar after engagement of said abutment finger with said first abutment and operated to a second position by said trip bar after engagement of said abutment finger with said second abutment.

7. A mechanism for actuating a limit control switch comprising, a condition responsive element, a main lever movable by said condition responsive element about a fixed pivot, a movable pivot carried by the free end of said main lever, a spring opposing movement of said movable pivot in one direction of travel of said main lever and aiding movement of said movable pivot in another direction of travel of said main lever, a trip lever connected to said movable pivot and movable therewith, an abutment finger on said trip lever, a first abutment for engagement with said abutment finger in one direction of travel of said trip lever, adjustable means for raising and lowering said first abutment, a second abutment for engagement with said abutment finger in another direction of travel of said trip lever, an abutment spring biasing said second abutment in one direction, a trip bar connected to the free end of said trip lever, a switch operable to a first position by said trip bar after engagement of said abutment finger with said first abutment and operable to a second position by said trip bar after engagement of said abutment finger with said second abutment, and a member connecting said switch with said main lever whereby said switch is operated to said first position by continued movement of said main lever below a predetermined minimum operating point of said condition responsive device.

8. An actuating mechanism for a switch comprising, a casing, a condition responsive element providing linear movement fastened to said casing, a pivot pin secured to said casing, a main lever movable about said pivot pin in response to movement of said condition responsive element, a movable pivot carried by the free end of said main lever, a trip lever secured at one of its ends to said movable pivot, a spring biasing said movable pivot in one direction, a trip bar secured to the free end of said trip lever, a first abutment engageable by said trip lever in one direction of travel of said trip lever, a second abutment engageable by said trip lever in another direction of travel of said trip lever, said abutments engaging said trip lever at a point intermediate its free end and its pivotally secured end, and a switch operated to a first position by said trip bar after engagement of said trip lever with said first abutment and operated to a second position by said trip bar after engagement of said trip lever with said second abutment.

9. A control mechanism of the type utilizing a liquid expansion temperature responsive element comprising: pivotally mounted switch blades, cooperating contacts carried by the switch blades and biased to closed position, motion transmitting means comprising a pivotally movable lever system interposed between said element and said switch blades, means forming a part of said lever system for engaging and pivotally moving one of said switch blades to open said contacts as said lever system is moved in one direction by said element, said means releasing said one switch blade to close said contacts as said lever system is moved in the other direction, a trip member extending from said lever system and engaging another of said switch blades after movement of said lever system sufficiently in said other direction to thereby open said contacts independently of said means.

10. A control mechanism of the type utilizing a liquid expansion temperature responsive element comprising: a casing supporting said element and a pivot pin, a main lever pivotally mounted intermediate its ends on said pivot pin, a secondary lever pivotally mounted at one of its ends on said main lever and extending in overlying relation therewith, a spring biasing said main and secondary levers in one direction, an abutment finger on said secondary lever, a trip bar connected to the free end of said secondary lever, opposing fixed abutments adapted to be engaged by the abutment finger as the main lever is moved by said element, and switch control means cooperable with said trip bar of said secondary lever.

JURG A. SENN.

References Cited in the file of this patent

UNITED STATES PATENTS

| Number | Name | Date |
|---|---|---|
| Re. 17,304 | Knaak | May 28, 1929 |
| 733,561 | Sundh | July 14, 1903 |
| 2,389,436 | Kearney | Nov. 20, 1945 |